(12) United States Patent
Laxström (10) Patent No.: US 10,328,992 B2
(45) Date of Patent: Jun. 25, 2019

(54) BICYCLE (71) Applicant: Zakarias Laxström, Vasa (FI)

(72) Inventor: Zakarias Laxström, Vasa (FI)

( * ) Notice: Subject to any disclaimer, the term of this patent is extended or adjusted under 35 U.S.C. 154(b) by 200 days.

(21) Appl. No.: 15/291,429

(22) Filed: Oct. 12, 2016

(65) Prior Publication Data

US 2018/0099721 A1    Apr. 12, 2018

(51) Int. Cl.
*B62K 19/24*    (2006.01)
*B62K 3/04*    (2006.01)
*B62K 15/00*    (2006.01)

(52) U.S. Cl.
CPC .............. *B62K 19/24* (2013.01); *B62K 3/04* (2013.01); *B62K 15/008* (2013.01)

(58) Field of Classification Search
CPC ...... B62M 11/02; B62K 15/00; B62K 15/006; B62K 15/008; B62K 19/24; B62K 13/04; B62K 3/04
USPC ........................................................ 280/287
See application file for complete search history.

(56) References Cited

U.S. PATENT DOCUMENTS

| | | | | |
|---|---|---|---|---|
| 531,121 A * | 12/1894 | Hofbeck | ............... | A47B 3/0912 403/100 |
| 2,708,587 A * | 5/1955 | Zuck | ..................... | B62K 15/006 280/278 |
| 3,865,403 A * | 2/1975 | Majerus | ............... | B62K 15/008 280/287 |
| 4,296,940 A * | 10/1981 | Herbert | ................ | B62K 15/008 280/278 |
| 4,433,852 A | 2/1984 | Hon | | |
| 4,440,414 A * | 4/1984 | Wang | ................... | B62K 15/008 280/278 |
| 4,460,191 A * | 7/1984 | Ishibashi | .............. | B62K 15/008 280/278 |

(Continued)

FOREIGN PATENT DOCUMENTS

CN    2093806 U    1/1992
CN    101973339 A    2/2011
(Continued)

OTHER PUBLICATIONS

Mar. 7, 2018 Search Report issued in European Patent Application No. 17195709.5.

(Continued)

*Primary Examiner* — Joseph M Rocca
*Assistant Examiner* — Conan D Duda
(74) *Attorney, Agent, or Firm* — Oliff PLC (57) ABSTRACT

A foldable bicycle has a frame with a seat tube, a down tube and a top tube. An inclined strut is pivotable with the top tube and with an openable connection to the down tube. The down tube is connected with a joint to a crankshaft bearing housing so that a rotation axle in this joint is turned to form an angle to a line substantially parallel to the crankshaft bearing housing's longitudinal axis. The top tube is connected through a joint to the seat tube so that a rotation axle in this joint is turned to form an angle around the seat tube's longitudinal axis. The top tube is at its other end that's opposite the seat tube connected with a joint to the head tube so that a rotation axle in this joint is substantially perpendicular to the longitudinal axes of both the head tube and top tube.

17 Claims, 6 Drawing Sheets

(56) References Cited

U.S. PATENT DOCUMENTS

| | | | | |
|---|---|---|---|---|
| 4,460,192 A * | 7/1984 | Takamiya | ............ | B62K 15/008 280/278 |
| 4,582,335 A * | 4/1986 | Paioli | ...................... | B62K 13/02 280/278 |
| 4,895,386 A * | 1/1990 | Hellestam | ............ | B62K 15/008 280/278 |
| 5,052,706 A * | 10/1991 | Tsai | ...................... | B62K 15/006 280/278 |
| 5,069,468 A | 12/1991 | Tsai et al. | | |
| 5,730,670 A * | 3/1998 | Ferrarin | ................ | B62K 15/006 474/79 |
| 6,032,971 A * | 3/2000 | Herder | ................. | B62K 15/008 280/278 |
| 6,527,291 B1 * | 3/2003 | Hurtig | ........................ | B62J 1/08 280/287 |
| 6,595,536 B1 * | 7/2003 | Tucker | ................... | B62K 15/00 280/278 |
| 8,894,084 B1 * | 11/2014 | Yap | ....................... | B62K 15/008 280/278 |
| 9,902,454 B1 * | 2/2018 | Keci | ..................... | B62K 15/006 |
| 2005/0062256 A1 * | 3/2005 | Chen | ..................... | B62K 15/008 280/287 |
| 2006/0061060 A1 * | 3/2006 | Chen | ..................... | B62K 15/006 280/287 |
| 2009/0115167 A1 * | 5/2009 | Chin | ....................... | B62K 11/10 280/639 |
| 2010/0066055 A1 * | 3/2010 | Laxstrom | ............. | B62K 15/008 280/287 |
| 2013/0119635 A1 * | 5/2013 | Montero Basqueseaux | ................. | B62K 15/008 280/287 |
| 2014/0239611 A1 * | 8/2014 | Hon | ..................... | B62K 15/008 280/287 |
| 2015/0203166 A1 * | 7/2015 | Kitchen | ................. | B62K 13/00 280/7.1 |
| 2017/0021892 A1 * | 1/2017 | Montague | ................. | B62K 3/02 |
| 2017/0066496 A1 * | 3/2017 | Ochner | .................. | B62K 3/002 |
| 2017/0210439 A1 * | 7/2017 | Schwaiger | ............ | B62K 15/008 |

FOREIGN PATENT DOCUMENTS

| | | |
|---|---|---|
| CN | 204527468 U | 8/2015 |
| EP | 0323964 A1 | 7/1989 |
| EP | 2409906 A2 | 1/2012 |
| GB | 2021055 A | 11/1979 |
| WO | 8801961 A1 | 3/1988 |
| WO | 2012/037798 A1 | 3/2012 |

OTHER PUBLICATIONS

May 8, 2017 Office Action issued in Finnish Patent Application No. 20165774.

* cited by examiner

BICYCLE

TECHNICAL FIELD

The present invention relates to a bicycle according to the preamble of claim 1. A bicycle of this type is arranged to be foldable so as to easily transform into a portable package and, at the same time, to facilitate the storage of the bicycle thanks to its smaller space requirement.

PRIOR ART

It is known per se to provide foldable bicycles. Often these bicycles are, however, equipped with small wheels that make the use of the bicycle uncomfortable. A bicycle of this type is disclosed in patent publication U.S. Pat. No. 4,433,852, for instance. Such bicycles usually comprise a foldable frame that makes it possible to fold the front and back wheels of the bicycle against each other. This structure is made possible due to the open structure of the frame with only two frame posts. For the folding of a bicycle with wheels larger than its diameter and a closed-type frame, often referred to as a diamond frame, the structural solutions become immediately more difficult due to the three frame posts that form a rigid structure. Known solutions that endeavour to find a working concept include patent publication U.S. Pat. No. 5,069,468, for example. However, the presented solution causes problems in view of the rigidity of the closed frame, the durability of the joints used in the frame, and the reliability of the locking mechanism.

Presentation of the Problem

With the present invention, the problems of known solutions can be essentially avoided. The object of the invention is, thus, to provide an easy-to-handle and durable foldable bicycle. The cyclist should be able to quickly and simply fold the bicycle into a compact package that is easy to carry and store. The bicycle should be transportable in public transportation as well as storable in today's small apartments. The bicycle should also be easy and quick to open into operational mode without having to use specific tools for this. This object is achieved in accordance with the invention by providing the bicycle of the invention the characterizing features of claim 1. The subsequent dependent claims present appropriate further developments and variations of the invention which further improve its operation.

The invention is based on the idea that the front and back wheels of the bicycle can be set side by side with a few simple movements. The wheels should, in spite of their new location, be able to freely rotate so as to simplify the transportation of the bicycle.

In the following description, the terms "up", "down" and the like refer to directions in relation to the bicycle or its structural details as shown in the attached figures.

With the device described in the present invention, a plurality of significant advantages are achieved over the prior art. One of these is the fact that the front and back wheels of the bicycle can be maneuvered into a substantially parallel position. The fact that the wheels are parallel or close to parallel improves both the appearance of the folded bicycle and its function. For instance, it is considerably easier to transport the folded bicycle.

The operation of the present invention is based mainly on the structure that permits the turning of the top tube of the bicycle in relation to the seat tube. This turning also determines the distance between the front and back wheels that have been brought together.

By adding another turning essentially perpendicular to the section plane of the earlier turning of the same joint, a change is achieved in the direction of the wheels in relation to each other. However, this takes place without essentially changing the distance between the wheels.

By means of the first turning of the joint between the top tube and seat tube, the wheels can be maneuvered to be at a correct distance from each other, while an adjustment by the later turning can fine-tune the parallel direction between the wheels.

The present invention makes it possible to construct a foldable bicycle that is simple to use but, at the same time, has a sufficiently rigid frame structure.

Further advantages and details of the invention become apparent from the description below.

BRIEF DESCRIPTION OF THE FIGURES

In the following, the invention will be described in greater detail with reference to the drawing, in which.

PREFERRED EMBODIMENT

The above figures do not show the bicycle in scale but are only intended to illustrate structural solutions of the preferred embodiments and the operation of the embodiments. Herein, the structural parts shown in the figures and denoted with reference numerals correspond to the structural solutions that are presented in the description below and are at the same time indicated by their reference numbers.

Figure 1:
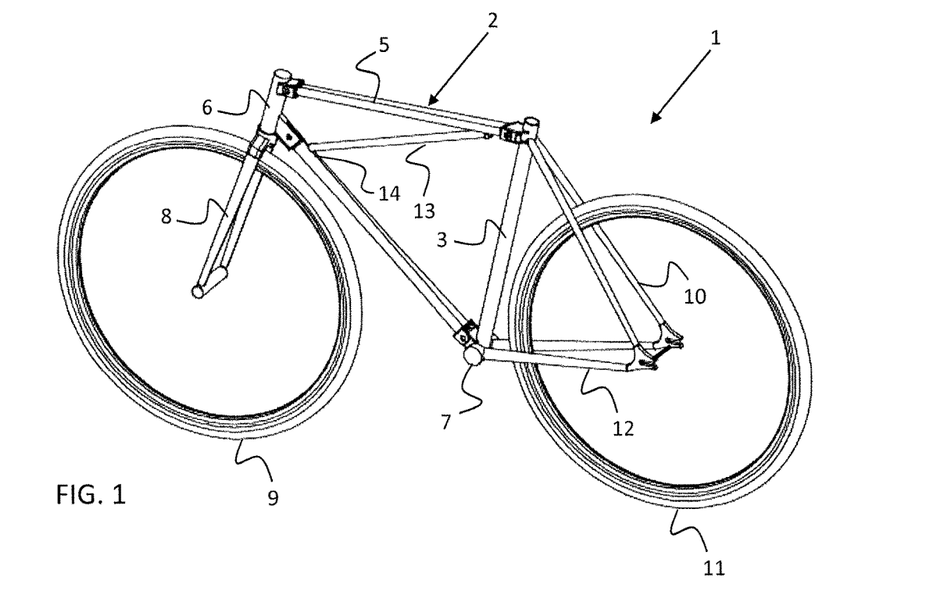
FIG. 1 shows an axonometric representation of a foldable bicycle according to the present invention.

As shown in FIG. 1, the bicycle 1 comprises the usual main components. The bicycle frame 2 is of the closed type, also referred to as diamond frame. It is made up of three frame tubes, in other words, a seat tube 3, a down tube 4 and a top tube 5 that form a rigid triangle structure. The top tube and down tube converge in a head tube 6, while the seat tube and down tube converge in a crankshaft bearing housing 7. The top tube and seat tube join below the seat of the bicycle (not shown). From the head tube, a front fork 8 extends downward to be joined to a front wheel 9. From the opposite end of the head tube, a steering tube extends upward, to which handlebars are joined with a steering stem (not shown).

In the rear half of the bicycle, there is a back fork 10, usually joined to the seat tube 3. The back fork is attached to a back wheel 11 and two chain stays 12 that extend out of the crankshaft bearing housing 7. The seat tube partly surrounds a seat tube, to which the seat of the bicycle is arranged (not shown), while the crankshaft bearing housing has two pedal cranks with as many pedals (not shown).

Figure 5:
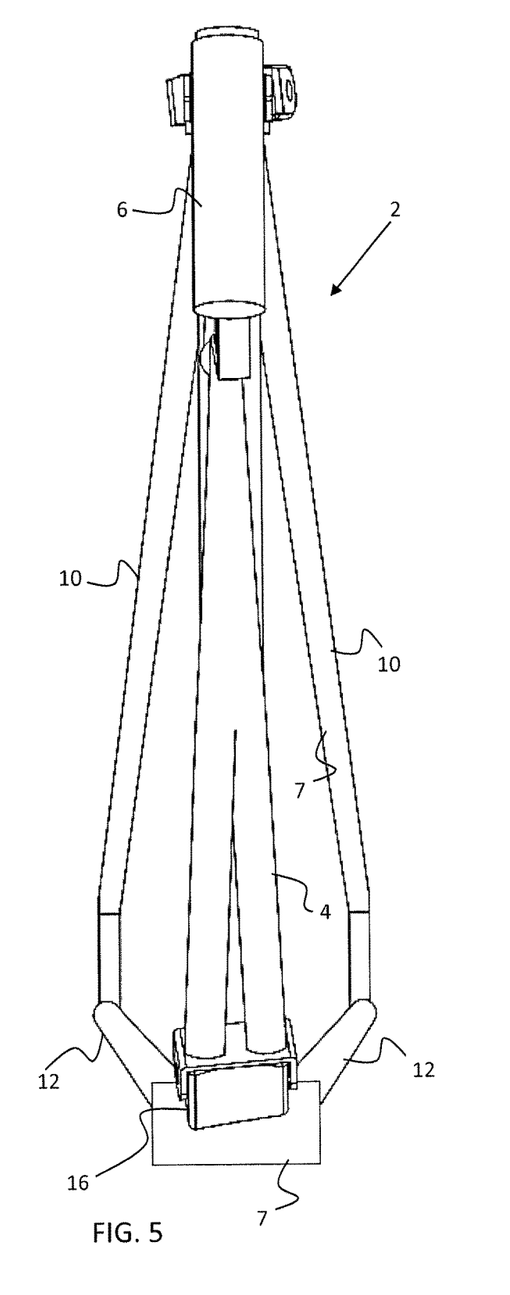
FIG. 5 shows a frame according FIG. 4 from the front.
Figure 6:
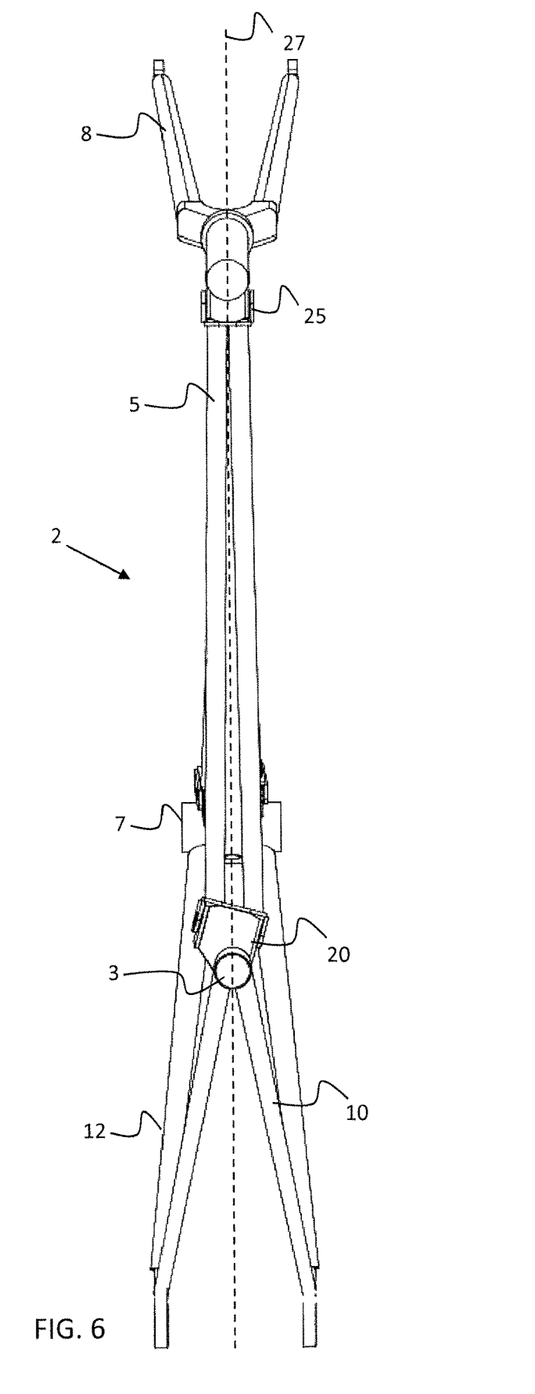
FIG. 6 shows a frame according FIG. 4 from above.

In the present figures, the bicycle parts are shown as substantially round structural parts, but may also be oval or polygonal. The structural parts can be made as simple, double parallel parts or as a combination of these depending on the manufacturing material and required rigidity. The structural parts can be made of metal, various fiber materials or even wood. They may be hollow or compact depending on the material and cross-sectional form. For example, FIG. 5, which is a front view of the bicycle 1, and FIG. 6, which is a top view of the bicycle, show that the top tube 5 is made of two substantially parallel parts. The down tube 4 is, in turn, made as a Y tube that widens close to the crankshaft bearing housing 7.

To stabilize the frame 2 of the present foldable bicycle 1, it also has an inclined strut 13 that extends from the top tube 5 to the down tube 4. The inclined strut is arranged in a pivoted manner to the top tube while the connection 14 to the down tube is arranged to be opened, i.e. the inclined strut can be detached from the down tube with a few simple movements.

Figure 2:
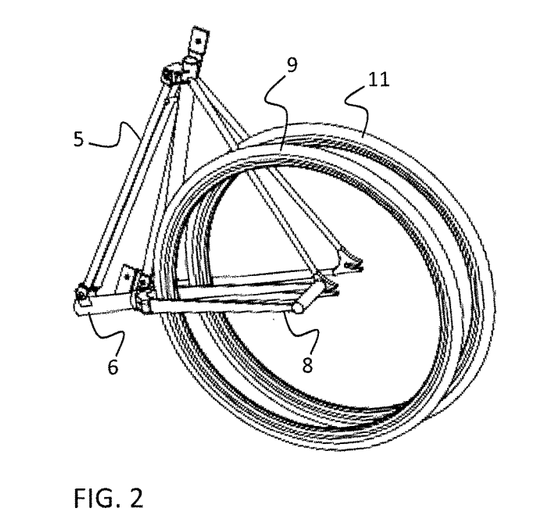
FIG. 2 shows a bicycle according to FIG. 1 in folded state from the side.
Figure 3:
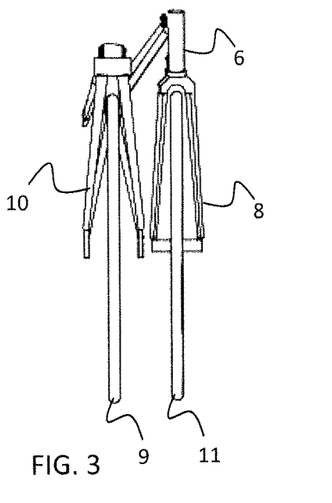
FIG. 3 shows a bicycle according to FIG. 2 in folded state from below.
Figure 4:
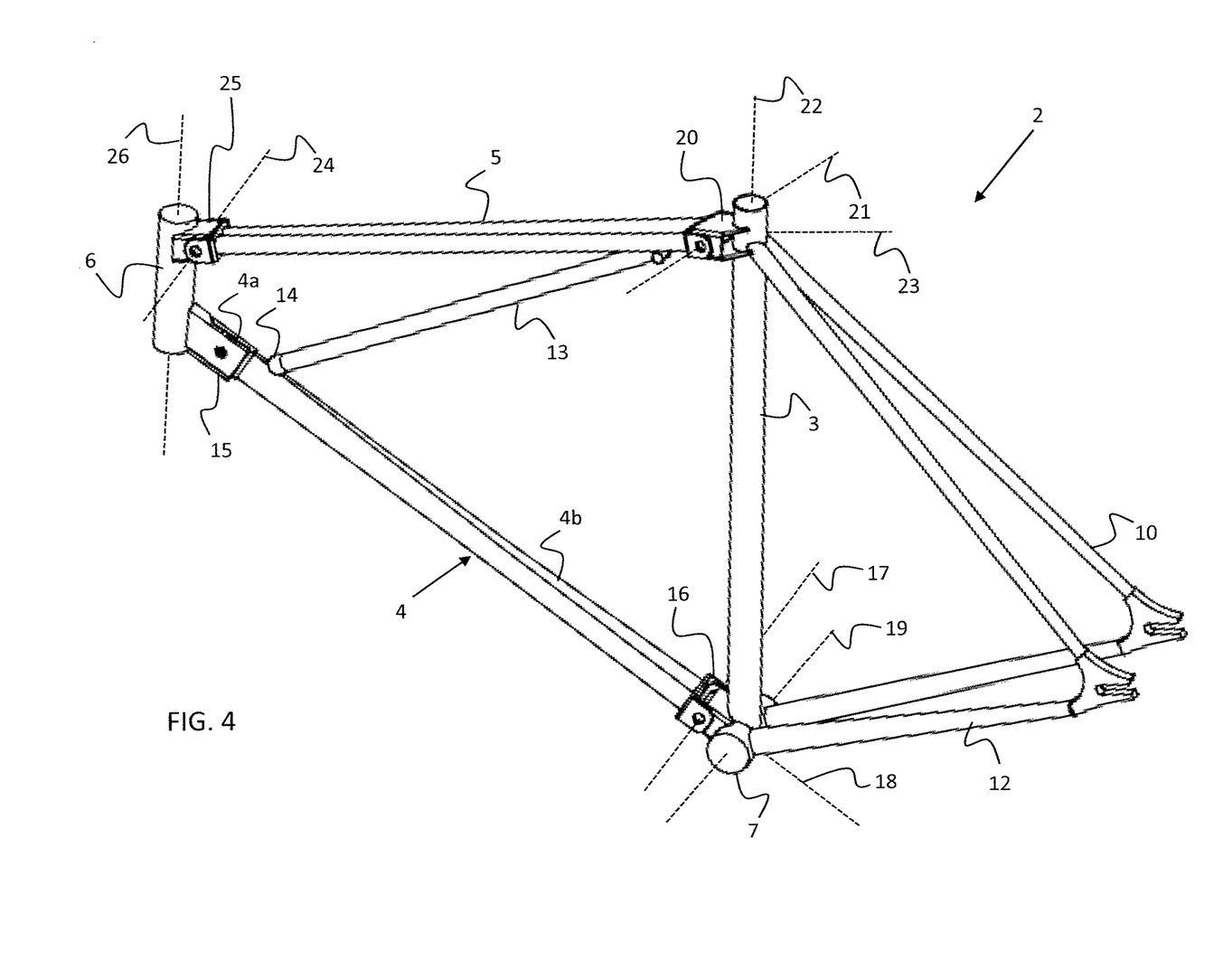
FIG. 4 shows an axonometric representation of the frame of a foldable bicycle according to the present invention.
Figure 7:
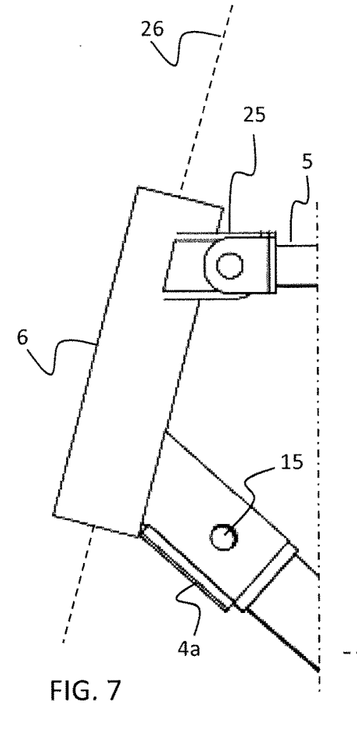
FIG. 7 shows a frame joint at the head tube from the side.

The folding of a bicycle 1 according to the present embodiment is possible through some specific structural solutions shown in FIG. 4. Firstly, the down tube 4 comprises two parts 4a and 4b that are detachably attached to each other (see FIG. 2). The front part 4a of the two-part down tube is rigidly joined with the head tube 6, while the rear part 4b of the down tube is joined in a pivoted manner to the crankshaft bearing housing 7. The front and rear parts are joined with a mechanical connection 15, for instance a screw joint shown in FIG. 7.

The above-mentioned inclined strut 13 extends from the top tube 5 to the two-part down tube 4 in such a manner that the connection 14 to the down tube is arranged to be between the crankshaft bearing housing 7 and connection 15 that connects the front 4a and rear 4b parts of the down tube. In a specific embodiment, it is even possible that the inclined strut extends from the top tube to the two-part down tube in such a manner that the connection to the down tube is arranged to be in the connection 15 that connects the front and rear parts of the down tube.

Figure 9:
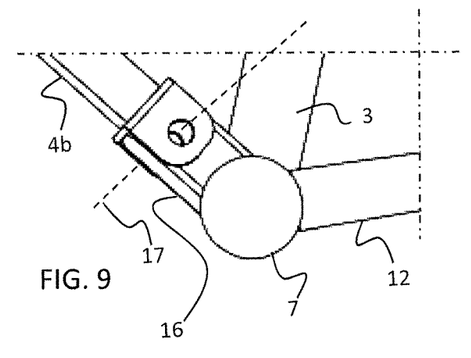
FIG. 9 shows the frame joint at a crankshaft bearing housing from the side.
Figure 13:
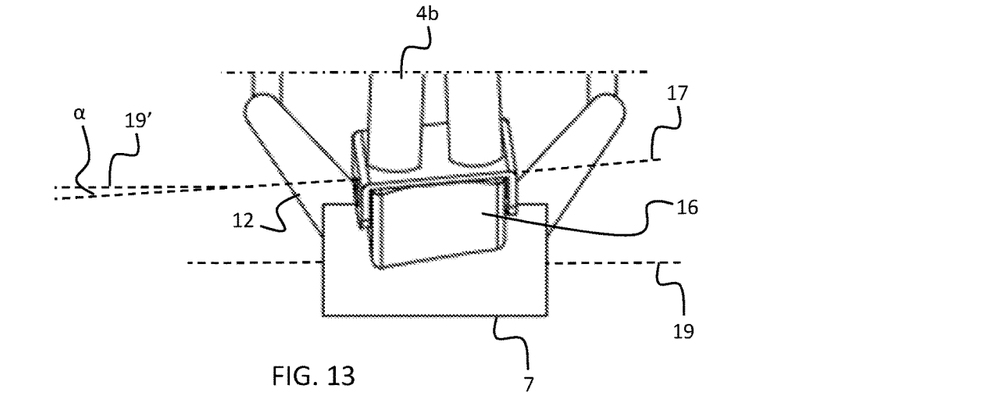
FIG. 13 shows the frame joint at the crankshaft bearing housing from the front.
Figure 14:
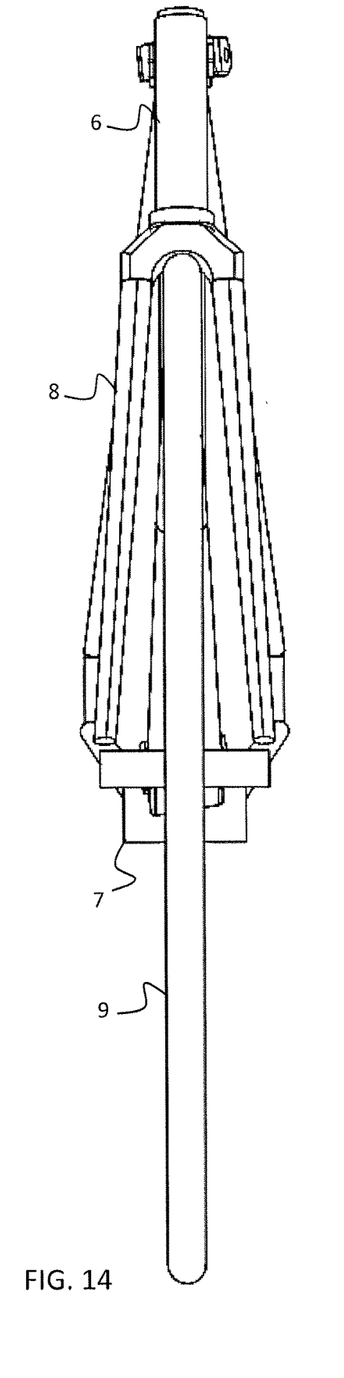
FIG. 14 shows a bicycle in operational mode from the front.
Figure 15:
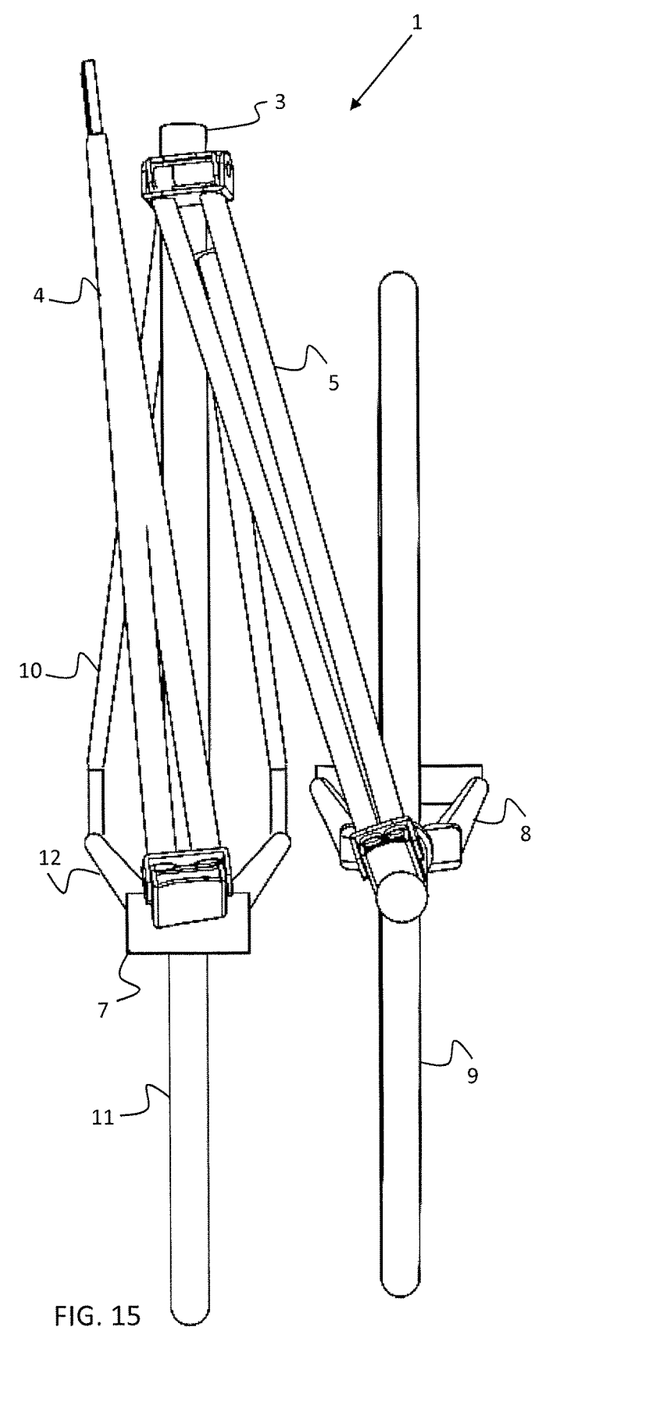
FIG. 15 shows a bicycle in folded state from the front.

Secondly, the rear part 4b of the down tube has a pivoted connection 16, in which a rotation axle 17 is on a plane perpendicular to the longitudinal axis 18 of the rear part of the down tube, see FIG. 4. The structure is also shown in detail in FIGS. 9 and 13. The rotation axle 17 of the pivoted connection 16 is at the same time turned in the above-mentioned plane in such a manner that it is at an angle α against a line that is parallel to the longitudinal axis 19 of the crankshaft bearing housing 7, wherein the parallel line is marked by 19', see FIG. 13. This angle is in the size range of 2 to 11 degrees, preferably 6 to 7 degrees. The turning preferably occurs counter-clockwise around the longitudinal axis 18 as seen along the longitudinal axis toward the crankshaft bearing housing. The angling of the rotation axle 17 of the joint 16 that connects the rear part 4b of the down tube to the crankshaft bearing housing 7 causes the part of the down tube to be moved in relation to the seat tube 3, when the down tube is folded during the folding of the bicycle 1. This is shown in FIG. 15, for instance.

Figure 8:
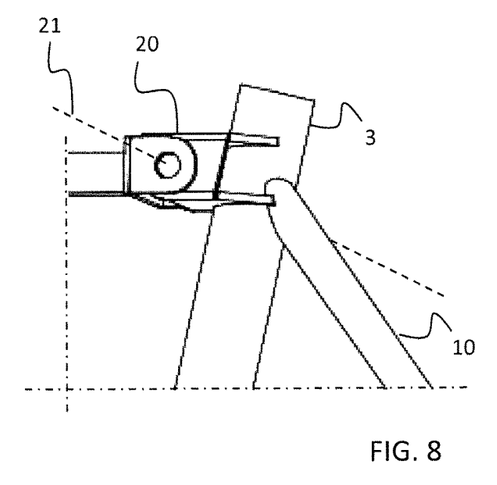
FIG. 8 shows the frame joint at the seat tube from the side.
Figure 10:
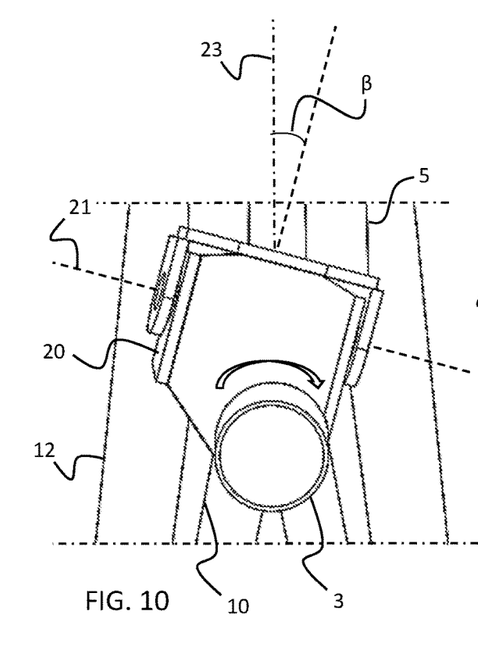
FIG. 10 shows the frame joint at the seat tube from above.
Figure 11:
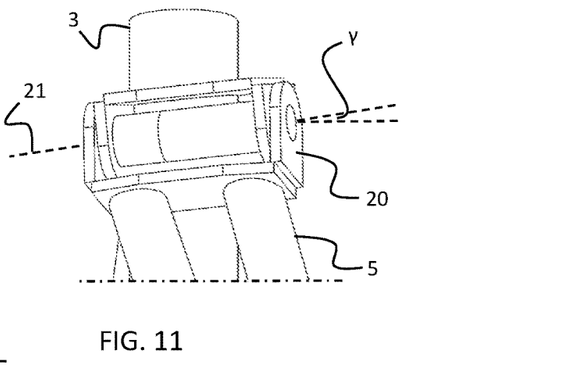
FIG. 11 shows the frame joint at the seat tube in the folded state of the bicycle from the front.

Thirdly, the top tube 5 has at one end thereof a pivoted connection 20, where it connects with the seat tube 3, see FIG. 4. The structure is also shown in detail in FIGS. 8, 10, and 11. The rotation axle 21 in this pivoted connection is substantially perpendicular to the longitudinal axis of the seat tube 22. At the same time, the rotation axle is turned around this longitudinal axis in such a manner that it is at an angle β that is in the size range of 7 to 23 degrees, preferably 13 to 17 degrees, in relation to the longitudinal axis 23 of the top tube, see FIG. 10. The turning preferably takes place clockwise around the seat tube as seen in a direction toward the crankshaft bearing housing. The essential thing herein is that the rotation axle 21 of the top tube is turned around the seat tube 3 in a direction opposite to the turning of the rotation axle 17 of the rear part 4b of the down tube around the longitudinal axis 18 of the rear part 4b of the down tube, as seen in a direction toward the crankshaft bearing housing 7. The angling of the rotation axle of the top tube means that the even the top tube will be moved in relation to the seat tube 3, when the top tube 5 is folded down during the folding of the bicycle 1. Due to the different directions of each rotation axle 17 and 21, the top tube and the rear part of the down tube will take a final position on the opposite sides of the seat tube when the bicycle is folded.

Fourthly, the top tube 5 has at its second end that is opposite the seat tube 3 a pivoted connection to the head tube 6, see FIG. 4. The structure is also shown in detail in FIG. 7. The rotation axle 21 in this pivoted connection 25 is arranged to be substantially perpendicular to both the longitudinal axis of the head tube 26 and the longitudinal axis 23 of the top tube. Thanks to this joint, it is possible to fold the head tube-mounted front fork 8 and the front wheel 9 in it against the back wheel 11. With this last folding, the outer dimensions of the folded package can be minimized.

Figure 12:
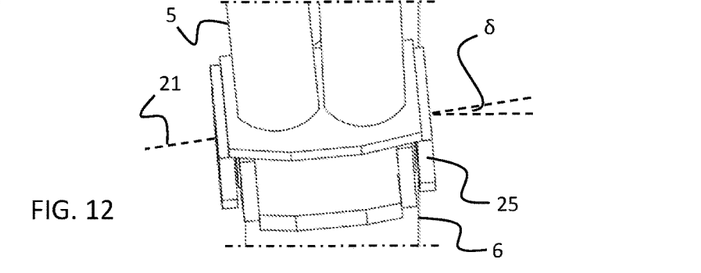
FIG. 12 shows the frame joint at the head tube from the back.

So as to further ensure that the path of movement of the front wheel 9 does not, during the folding of the bicycle 1, coincide with any other structural parts of the bicycle, the rotation axle 21 in the joint 20 between the top tube 5 and seat tube 3 should preferably be allowed to be on a plane that is substantially parallel to the seat tube. The rotation axle can now be given a turn γ on this plane, which is in the size range of 2 to 9 degrees, preferably 5 to 6 degrees to the normal of the cross-sectional plane 27 of the bicycle, when it has followed the joint between the top tube and seat tube during its turning around the longitudinal axis of the seat tube, see FIGS. 10 and 11. The rotation takes place counter-clockwise, when the joint is seen along the top tube toward the seat tube. The same result can also be achieved by allowing the rotation axle 24 in the joint 25 between the top tube 5 and head tube 6 instead to be on a plane that is substantially parallel to the head tube. After this, the rotation axle 24 is allowed to turn on this plane to a corresponding angle δ, which is in the size range of 2 to 9 degrees, preferably 5 to 6 degrees, to the normal of the cross-sectional plane 27 of the bicycle, see FIG. 12. The rotation takes place counter-clockwise, when the joint is seen along the top tube toward the head tube. A bicycle according to the present embodiment can be folded in a manner that is best shown in FIGS. 1 to 3 and 14 and 15.

First, the connection 14 between the inclined strut 13 and down tube 4 is opened and the inclined strut is folded against the top tube 5. Then, the connection 15 that joins both parts of the down tube is opened. The freed rear part 4b of the down tube can now be rotated clockwise in relation to the rotation axle 17 into a position beside the seat tube 3. The front half of the bicycle is now free to be rotated around the rotation axle 21 against the rear half of the bicycle.

The top tube 5 is rotated counter-clockwise around the rotation axle 21 of the top tube toward the seat tube 3, where it takes a position beside the seat tube which is opposite that of the inclined strut 13. At the same time, the front wheel 9 swings in a direction toward the back wheel 11. To finally set the front wheel against the back wheel, the head tube 6 is rotated counter-clockwise around the rotation axle 24. When the wheels are beside each other, their axles can preferably be locked to each other to, thus, stabilize the folded bicycle. By fastening the wheel axles to each other, it also becomes possible for the wheels to continue to roll freely on a base, which facilitates the transport of the folded bicycle.

The above description and the related figures are only intended to illustrate the present solution for the construction of a bicycle. Thus, the solution is not confined merely to the embodiments described above or in the attached claims but a plurality of variations or alternative embodiments is feasible within the idea described in the attached claims.

The invention claimed is:

1. A folding bicycle comprising:
    a frame having a seat tube, a down tube, and a top tube which form a rigid triangle structure, wherein
    the top tube and down tube are connected to a head tube, while
    the seat tube and down tube are connected to a crankshaft bearing housing,
    the top tube and seat tube are joined below a seat of the bicycle,
    the bicycle further has front and back wheels connected with the frame via a front fork and rear fork,
    an inclined strut extends from the top tube to the down tube, the inclined strut being joined to the top tube via a pivot, while a connection of the inclined strut to the down tube is arranged to be opened,
    the down tube comprises two parts detachably attached to each other,
    the top tube is at one end connected to the seat tube via a first pivot joint, a rotation axis of the first pivot joint being at a non-perpendicular angle β with respect to a longitudinal axis of the top tube, as viewed from above the bicycle,
    the rotation axis of the first pivot joint is at a non-perpendicular angle γ with respect to a longitudinal axis of the seat tube as viewed from a front of the bicycle, the angle γ being on a first plane that is parallel to the seat tube, the angle γ being 2 to 9 degrees with respect to a line perpendicular to a second plane that passes through the top tube, the seat tube and the down tube in an unfolded state of the bicycle,
    the top tube is at its other end that is opposite the seat tube connected in a pivoted manner with the head tube at a joint, so that a rotation axis in the joint is perpendicular to the longitudinal axes of both the head tube and top tube, and
    in a folded state of the bicycle, the two parts of the down tube are detached from each other and no longer connected to each other.

2. A bicycle as claimed in claim 1, wherein the rotation axis in the first pivot joint is at the angle γ counter-clockwise with respect to the line perpendicular to the second plane when
    the rotation axis in the first pivot joint is at the angle β clockwise with respect to the top tube viewed along the seat tube toward the crankshaft bearing housing.

3. A bicycle as claimed in claim 1, wherein the rotation axis in the first pivot joint is at the angle γ clockwise with respect to the line perpendicular to the second plane when
    the rotation axis in the first pivot joint is at the angle β counter-clockwise with respect to the top tube viewed along the seat tube toward the crankshaft bearing housing.

4. A bicycle as claimed in claim 1, wherein the down tube is connected to the crankshaft bearing housing via a second pivot joint so that a rotation axis in the second pivot joint is on a third plane that is perpendicular to a longitudinal axis of the down tube and the rotation axis in the second pivot joint is at an angle α with respect to a line that is parallel to the longitudinal axis of the crankshaft bearing housing.

5. A bicycle as claimed in claim 1, wherein the down tube comprises a front part that is joined rigidly to the head tube, and a rear part that is connected with the crankshaft bearing housing via a second pivot joint.

6. A bicycle as claimed in claim 5, wherein the front and rear parts of the down tube are joined with a mechanical connection.

7. A bicycle as claimed in claim 6, wherein the mechanical connection is a screw connection.

8. A bicycle as claimed in claim 5, wherein the rotation axis of the second pivot joint is at an angle α with respect to a line that is parallel to the longitudinal axis of the crankshaft bearing housing, the angle α being 2 to 11 degrees.

9. A bicycle as claimed in claim 8, wherein the angle α is 6 to 7 degrees.

10. A bicycle as claimed in claim 5, wherein the angle β is 7 to 23 degrees.

11. A bicycle as claimed in claim 10, wherein the angle β is 13 to 17 degrees.

12. A bicycle as claimed in claim 10, wherein as seen in a direction along the seat tube toward the crankshaft bearing housing, the rotation axis of the first pivot joint is at a first acute angle with respect to the second plane, and the rotation axis of the rear part of the down tube is at a second acute angle with respect to the second plane, measured in a direction opposite to a direction of measuring the first acute angle.

13. A bicycle as claimed in claim 1, wherein the angle γ is 5 to 6 degrees.

14. A bicycle as claimed in claim 12, wherein the rotation axis in the joint between the top tube and head tube is on a plane parallel to the head tube and is at an angle on this plane, which is 2 to 9 degrees with respect to a second line perpendicular to the second plane.

15. A bicycle as claimed in claim 14, wherein the angle γ is 5 to 6 degrees.

16. A bicycle as claimed in claim 6, wherein the inclined strut extends from the top tube to the two-part down tube in such a manner that the connection to the down tube is arranged to be between the crankshaft bearing housing and the mechanical connection that joins the front and rear parts of the down tube.

17. A bicycle as claimed in claim 16, wherein the inclined strut extends from the top tube to the two-part down tube in such a manner that the connection to the down tube is arranged to coincide with the connection that joins the front and rear parts of the down tube.

* * * * *